Patented Aug. 6, 1935

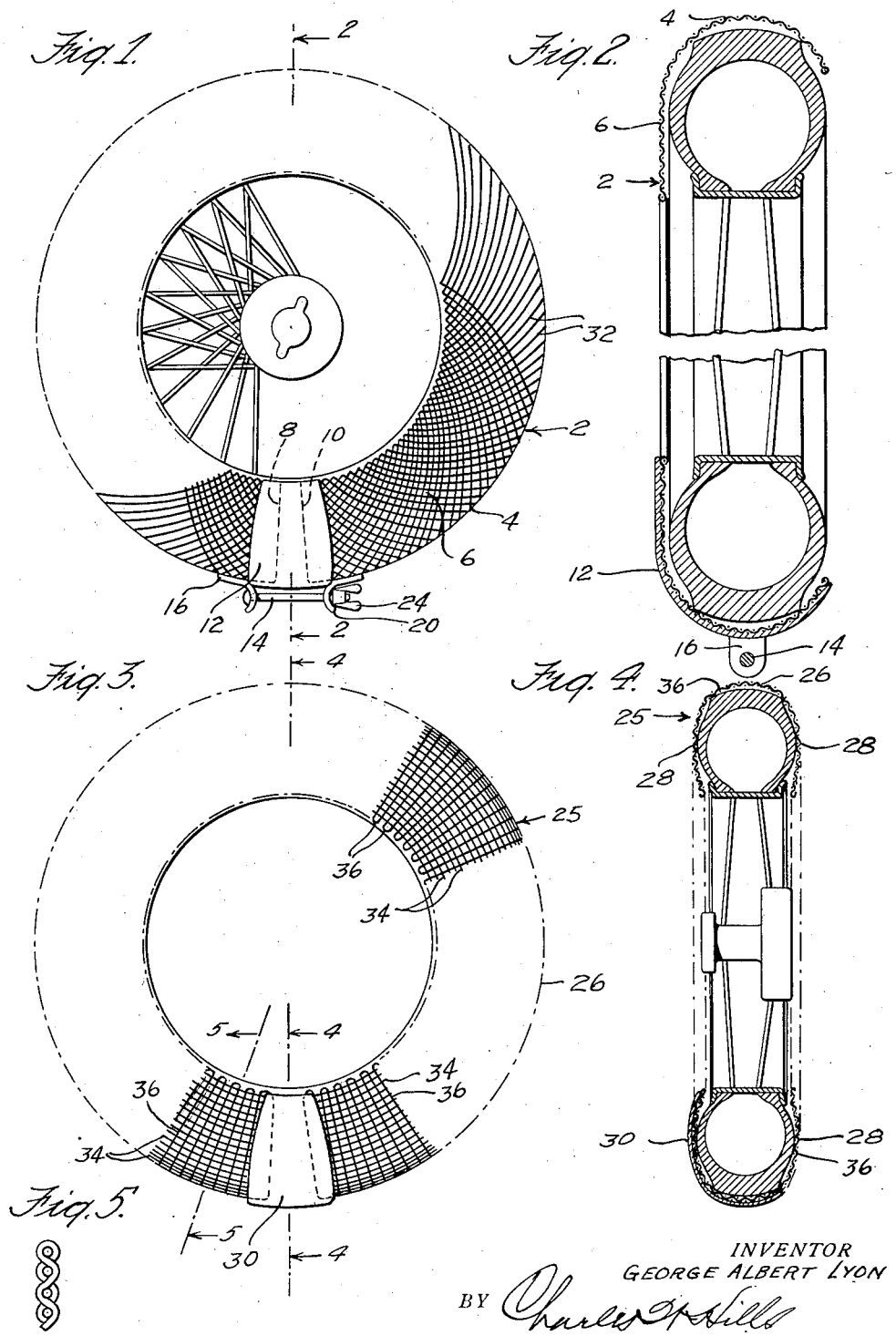

2,010,098

UNITED STATES PATENT OFFICE 2,010,098

TIRE COVER CONSTRUCTION

George Albert Lyon, Allenhurst, N. J., assignor to Lyon Incorporated, Asbury Park, N. J., a corporation of Delaware Application March 2, 1931, Serial No. 519,343

6 Claims. (Cl. 150—54)

This invention relates to covers for the spare tires of automobiles and more particularly to tire covers of the type comprising an enclosing casing made of metal or other relatively stiff material.

The principal objects of the invention are to improve the construction and mode of operation of tire covers of the above type and to produce a tire cover of this type of novel construction which is highly attractive in appearance and which may be readily applied to and removed from a tire.

With these and other objects in view, the invention consists in a tire cover embodying the novel and improved features, constructions and combinations of parts hereinafter described and particularly pointed out in the claims, the advantages of which will be evident to those skilled in the art.

The invention will be readily understood from the accompanying drawing illustrating the invention in its preferred form and the following detailed description of the constructions therein shown.

In the drawing Fig. 1 is a view in side elevation illustrating a construction embodying the invention;

Fig. 2 is a sectional view taken substantially on the line 2—2 of Fig. 1;

Fig. 3 is a view in side elevation illustrating a modified form of the invention;

Fig. 4 is a sectional view taken substantially on the line 4—4 of Fig. 3; and

Fig. 5 is a detail sectional view taken substantially on the line 5—5 of Fig. 3.

The tire cover is shown in the drawing as applied to a tire mounted on a rim.

In the construction shown in Figs. 1 and 2, the tire cover comprises an annular casing 2 consisting preferably of interwoven metallic strands. This casing is provided with a peripheral portion 4 having a concavo-convex cross section arranged to extend the peripheral portion of a tire and with a side portion or wall 6 extending inwardly from the peripheral portion of the cover toward the axis of the tire and arranged to cover one side of the tire. The casing is arranged to fit over the tire in the manner shown in Fig. 2, the tread of the tire fitting into the recess in the peripheral portion of the cover and the side wall portion 6 of the cover extending inwardly over the side wall of the tire. The peripheral portion of the cover is constructed to extend beyond the tread on that side thereof opposite the side portion 6 laterally and inwardly a short distance so as to overhang the corresponding side wall of the tire.

The casing is made in the form of a split ring, the ends of which are indicated at 8 and 10 in Fig. 1. The casing is radially expansible and contractible. The casing is expanded in applying the same to or in removing the same from a tire and, upon being applied to the tire is contracted to grip the tire tread and hold itself in position.

The casing is preferably constructed so that, when in tire covering position, the ends 8 and 10 of the ring are spaced some distance apart. In order to cover the space between the ends of the ring, a cover plate 12 is attached to one of the ends of the ring in overlapping relation thereto and is also arranged to overlap the other end of the ring as shown in Fig. 1.

The casing is preferably constructed so that when expanded and applied to a tire, it will contract by its own resilience and grip the periphery of the tire. If desired, means may be provided for moving relatively the spaced ends 8 and 10 of the casing toward each other to contract positively still further the casing. As shown in Figs. 1 and 2, the casing is provided with such means comprising a bolt 14 passing through an opening in a bracket 16 attached to the end 8 of the casing and engaging in a slot in a bracket 20 attached to the end 10 of said casing. Upon the bolt is threaded a wing nut 24 for engagement with the bracket 20.

In the construction shown in Figs. 3 and 4, the casing indicated as a whole at 25 comprises a peripheral portion 26 for covering the peripheral portion of a tire and two side portions or walls 28 extending inwardly from said peripheral portion toward the axis of the casing for covering both side walls of the tire.

The peripheral portion 26 has the same general shape in cross section as the peripheral portion 4 of the cover shown in Figs. 1 and 2 but the side portions 28 differ somewhat in shape from the shape of the side portion 6 of the casing shown in said first two figures. The side portions 28 each are concavo-convex in cross section to fit over the bulge in the corresponding side wall of the tire, the inner margins of said side portions being bent toward the central plane of the casing. This forms a relatively contracted space between the side portions 28 at the inner margins of said portions, which space increases from the said inner margins outwardly for some distance. The space between the inner margins of the side portions of the casing normally is considerably less than the maximum distance between the outer surfaces of the side walls of the tire to which the casing is to be applied.

Thus, in applying the tire cover to a tire, the side portions of the cover are relatively expanded to permit the tire to pass between the same and, after the bulges in the side walls of the tire have passed the inner margins of the side portions, said side portions are relatively contracted by the resilience of the metal into substantially the positions shown in Fig. 4. The side portions of the cover engage the side walls of the tire with a yielding pressure and this assists in holding the cover from displacement on the tire.

The casing shown in Figs. 3 and 4 is constructed to render the same radially flexible and resilient so that the casing may be expanded in applying the same to and removing it from a tire.

Upon the release of the casing, after its application to a tire, the radial contraction of the casing produced by the resilience of the metal causes the same to grip securely the tire to hold itself in position thereon.

The casing is provided with a cover plate 30 attached to one end of the casing to cover the space between the ends thereof.

The tire cover casings shown in this application are made of interwoven strands of metal. The casings may be made of interwoven strips of metal such as are commonly employed in the making of protective ornamental screens for automobile radiators or of metallic strips of any other character or size found suitable for the purpose. The casings also may be made of interwoven wires of any desired cross-section. The metallic strands may be interwoven in various ways to form a radially flexible resilient casing. As shown in Fig. 1 the casing is made up of interwoven strands 32 extending back and forth obliquely from one margin of the casing to the other. As shown in Fig. 3 the casing is made up of strands 34 extending about the casing substantially concentrically therewith and strands 36 extending back and forth from one margin of the casing to the other in the general directions of planes radial to the casing.

The tire cover construction above described has a very ornamental and attractive appearance, particularly when enameled in striking colors or when plated with chromium or nickel. The construction of the casing enables the same to be quickly and easily applied to or removed from a tire.

It is to be understood that the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. In a tire cover construction, an annular resilient casing comprising interwoven strands of metal and constructed to extend about the periphery of a tire and over one side thereof, said strands being so arranged as to enable the casing to be radially expanded in applying the casing to, and removing the same from, a tire, and to be contracted by its own resilience to hold itself in position on the tire.

2. In a tire cover construction, an annular split resilient casing of interwoven metallic strands and comprising side and rim portions for covering a side wall and the tread of a tire, said casing being radially expansible in its application to and removal from the tire, and contractible by its own resilience to hold itself in position on the tire.

3. In a tire cover construction, an annular split resilient casing of interwoven metallic strands and comprising side and rim portions for covering both side walls and the tread of a tire, said casing being radially expansible in its application to and removal from the tire, and contractible by its own resilience to hold itself in position on the tire.

4. In a tire cover construction, an annular split casing of interwoven metallic strands and comprising side and rim portions for covering a side wall and the tread of a tire, said casing being radially expansible in its application to and removal from the tire, and contractible to hold itself in position on the tire, and means for concealing the ends of the casing.

5. In a tire cover construction, an annular split resilient casing of interwoven metallic strands and comprising side and rim portions for covering both side walls and the tread of a tire, said casing being radially expansible in its application to and removal from the tire, and contractible by its own resilience to hold itself in position on the tire, the side portions of the casing being normally spaced apart a distance less than the distance between the outer surfaces of the side walls of the tire cover whereby, when the casing is in position on the tire, said side portions resiliently engage the side walls of the tire.

6. A tire cover having an opening on one side and being formed so as to enable said opening to be enlarged sufficiently to permit placement of the same on a tire and to be thereafter contracted sufficiently to cause the cover to embrace the tire and hold itself thereon, a portion of said cover at the other side being wide enough to extend inwardly beyond the center of the tread of the tire, said cover being formed of radial curved strands with metal strands woven on the same to make a semi-rigid fabric.

GEORGE ALBERT LYON.